(12) United States Patent
Bernardi et al.

(10) Patent No.: US 9,838,804 B2
(45) Date of Patent: Dec. 5, 2017

(54) METHODS, SYSTEMS, AND DEVICES FOR ADAPTIVELY FILTERING AUDIO SIGNALS

(71) Applicant: Cochlear Limited, Macquarie University, NSW (AU)

(72) Inventors: Giuliano Bernardi, Macquarie University (AU); Martin Hillbratt, Macquarie University (AU); Toon van Waterschoot, Macquarie University (AU); Alberto Gozzi, Macquarie University (AU)

(73) Assignee: Cochlear Limited, Macquarie University, NSW (AU)

( * ) Notice: Subject to any disclaimer, the term of this patent is extended or adjusted under 35 U.S.C. 154(b) by 0 days.

(21) Appl. No.: 15/050,768

(22) Filed: Feb. 23, 2016

(65) Prior Publication Data

US 2016/0255446 A1   Sep. 1, 2016

Related U.S. Application Data

(60) Provisional application No. 62/126,117, filed on Feb. 27, 2015.

(51) Int. Cl.
*H04R 25/00* (2006.01)
(52) U.S. Cl.
CPC ....... *H04R 25/453* (2013.01); *H04R 2225/41* (2013.01)
(58) Field of Classification Search
CPC ........................... H04R 25/00; H04R 2225/41; H04R 2225/49; H04R 2460/01

(Continued)

(56) References Cited

U.S. PATENT DOCUMENTS

| 6,240,192 B1 * | 5/2001 | Brennan | H04R 25/505 381/312 |
| 6,480,610 B1 * | 11/2002 | Fang | H04R 25/453 381/318 |

(Continued)

FOREIGN PATENT DOCUMENTS

EP    1675374 B1    4/2010

OTHER PUBLICATIONS

Jia-Sien Soo, et al, "Multidelay Block Frequency Domain Adaptive Filter", IEEE Transactions on Acoustics, Speech, and Signal Processing, vol. 38, No. 2, Feb. 1990.

(Continued)

*Primary Examiner* — Suhan Ni
(74) *Attorney, Agent, or Firm* — Edell, Shapiro & Finnan, LLC

(57) ABSTRACT

Systems, methods, and devices for adaptively filtering audio signals are disclosed. An example system includes a microphone configured to generate a first audio signal in response to receiving a sound, an output transducer configured to provide an output, and a sound processor configured to: (i) filter a first sample of the audio input signal using an adaptive filter to provide a first filtered audio input signal, with the dynamic range of the adaptive filter being limited by an initial value of at least one parameter filter; (ii) process the first filtered audio signal to provide a output audio signal; and (iii) cause the output transducer to provide an output that is based at least in part on the output audio signal. Adaptive signal modeling may be used to update the adaptive filter, with model and the initial value of at least one parameter filter being based on environmental classifier.

20 Claims, 9 Drawing Sheets

(58) Field of Classification Search
USPC .......................................... 381/312, 317–318
See application file for complete search history.

(56) References Cited

U.S. PATENT DOCUMENTS

| | | | | |
|---|---|---|---|---|
| 8,130,991 B2* | 3/2012 | Rasmussen | .......... | H04R 25/453 |
| | | | | 381/317 |
| 8,189,833 B2* | 5/2012 | Klinkby | ............... | H04R 25/407 |
| | | | | 381/312 |
| 8,588,444 B2* | 11/2013 | Pape | .................... | H04R 25/453 |
| | | | | 381/312 |
| 2009/0028367 A1* | 1/2009 | Klinkby | ............... | H04R 25/453 |
| | | | | 381/318 |

OTHER PUBLICATIONS

Gerald Enzner, et al., Frequency-Domain Adaptive Kalman Filter for Acoustic Echo Control in Hands-Free Telephones, Institute of Communication Systems and Data Processing (IND), Oct. 19, 2005, pp. 1140-1156.

A. Spriet, et al., "Adaptive Feedback Cancellation in Hearing Aids," Journal of the Franklin Institute 343, pp. 545-573, Aug. 22, 2006.

Toon van Waterschoot, et al., "Optimally Regularized Adaptive Filtering Algorithms for Room Acoustic Signal Enhancement," Signal Processing, vol. 88, No. 3, Mar. 2008, pp. 594-611.

* cited by examiner

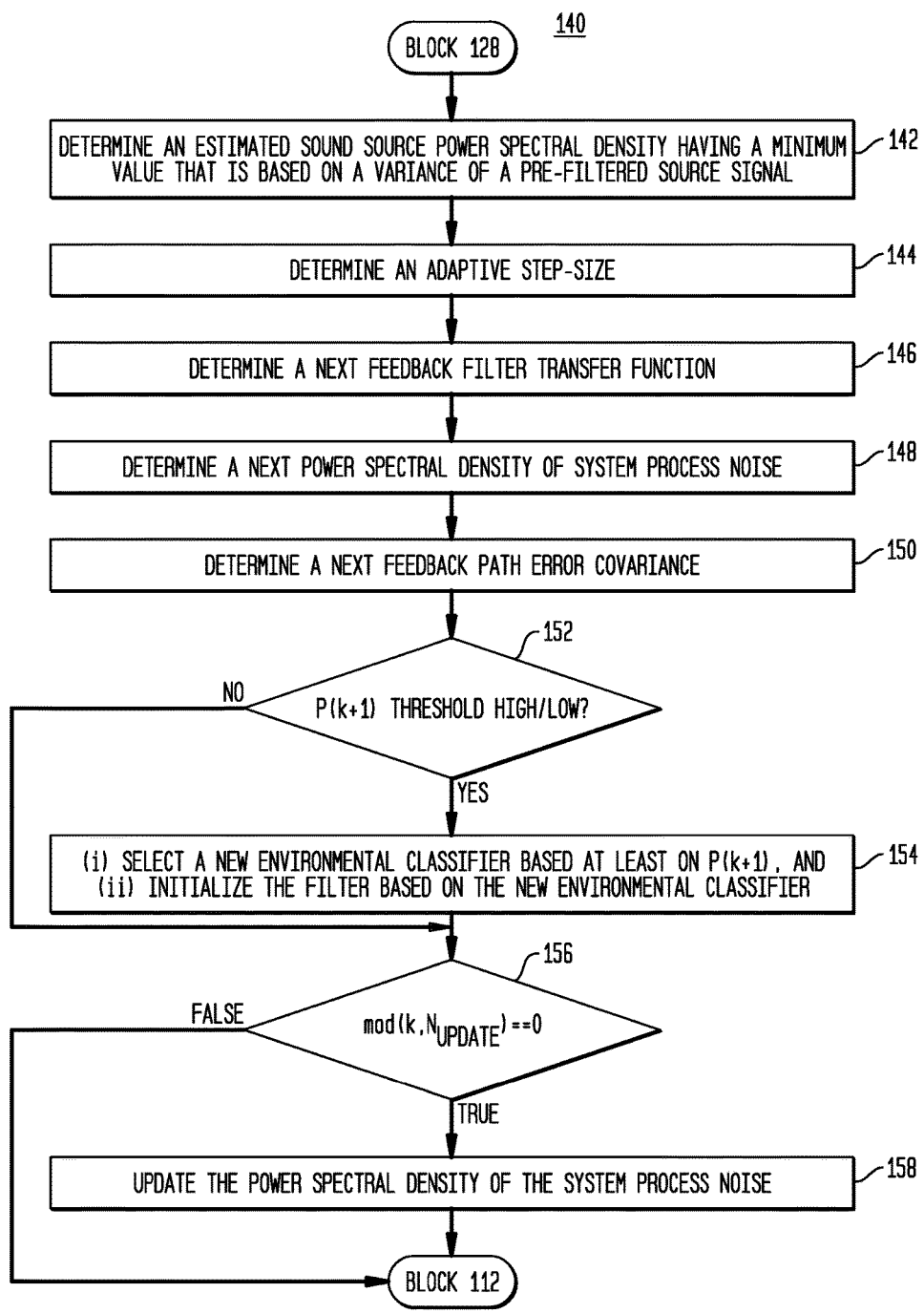

METHODS, SYSTEMS, AND DEVICES FOR ADAPTIVELY FILTERING AUDIO SIGNALS

CROSS-REFERENCE TO RELATED APPLICATIONS

The present application claims priority to U.S. Provisional Patent Application No. 62/126,117, filed on Feb. 27, 2015, entitled "Methods, Systems, and Devices for Adaptively Filtering Audio Signals," the content of which is hereby incorporated by reference herein.

BACKGROUND

Field of the Invention

The present invention relates generally to tissue-stimulating prostheses, and more particularly, to excitation modeling and matching in tissue-stimulating prostheses.

Unless otherwise indicated herein, the description provided in this section is not prior art to the claims and is not admitted to be prior art by inclusion in this section.

Various types of hearing devices provide people with different types of hearing loss with the ability to perceive sound. Hearing loss may be conductive, sensorineural, or some combination of both conductive and sensorineural. Conductive hearing loss typically results from a dysfunction in any of the mechanisms that ordinarily conduct sound waves through the outer ear, the eardrum, or the bones of the middle ear. Sensorineural hearing loss typically results from a dysfunction in the inner ear, including the cochlea where sound vibrations are converted into neural signals, or any other part of the ear, auditory nerve, or brain that may process the neural signals.

People with some forms of conductive hearing loss may benefit from hearing devices such as hearing aids or electromechanical hearing devices. A hearing aid, for instance, typically includes at least one small microphone to receive sound, an amplifier to amplify certain portions of the detected sound, and a small speaker to transmit the amplified sounds into the person's ear. An electromechanical hearing device, on the other hand, typically includes at least one small microphone to receive sound and a mechanism that delivers a mechanical force to a bone (e.g., the recipient's skull, or a middle-ear bone such as the stapes) or to a prosthetic (e.g., a prosthetic stapes implanted in the recipient's middle ear), thereby causing vibrations in cochlear fluid.

Further, people with certain forms of sensorineural hearing loss may benefit from hearing devices such as cochlear implants and/or auditory brainstem implants. Cochlear implants, for example, include at least one microphone to receive sound, a unit to convert the sound to a series of electrical stimulation signals, and an array of electrodes to deliver the stimulation signals to the implant recipient's cochlea so as to help the recipient perceive sound. Auditory brainstem implants use technology similar to cochlear implants, but instead of applying electrical stimulation to a person's cochlea, they apply electrical stimulation directly to a person's brain stem, bypassing the cochlea altogether, still helping the recipient perceive sound.

In addition, some people may benefit from hearing devices that combine one or more characteristics of the acoustic hearing aids, vibration-based hearing devices, cochlear implants, and auditory brainstem implants to perceive sound.

Hearing devices such as these typically include an external processing unit that performs at least some sound-processing functions and an internal stimulation unit that at least delivers a stimulus to a body part in an auditory pathway of the recipient. The auditory pathway includes a cochlea, an auditory nerve, a region of the recipient's brain, or any other body part that contributes to the perception of sound. In the case of a totally implantable hearing device, the stimulation unit includes both processing and stimulation components, though the external unit may still perform some processing functions when communicatively coupled or connected to the stimulation unit.

SUMMARY

An audio processing system can typically filter received audio signals to remove, or at least reduce, undesirable signal components included in the received audio signals, such as feedback artifacts, noise, echoes, or the like. Filtering may be accomplished through the use of static filters or adaptive filters. Whereas a static filter operates using constant-value parameters, an adaptive filter may include one or more adjustable parameters. By way of example, a sound processor may implement an adaptive feedback filter by predicting an amount of feedback included in a future audio signal based on one or more previously determined feedback estimations. While adaptive filters are generally more effective at removing undesirable signal components than static filters, implementing adaptive filters typically requires implementing more complex algorithms, which generally require greater processing capabilities to implement than a static filter.

To enhance the quality of sound perceived by a recipient, a hearing device may include an audio processing system configured to minimize the effect that undesirable signal components have on generated stimuli delivered to a recipient. Given the different acoustic environments in which a hearing device can operate, adaptive filters are generally preferred over static filters. But implementing some adaptive filters requires power resources and processing capabilities that make implementation in hearing devices impractical. For example, size and power constraints typically limit the sound processors of a hearing device to application-specific integrated circuits or programmable logic devices. Such sound processors are typically not able to perform the processing operations necessary to implement more advanced adaptive filters.

The present disclosure provides methods, systems, and devices for overcoming the power and processing constraints of a hearing device to implement complex adaptive filters, such as a Kalman filter. In accordance with the disclosure, a hearing device may limit a dynamic range (i.e., a total number of bits needed to implement the functions of the adaptive filter) by initializing a filter parameter with a predetermined initial value. By initializing the adaptive filter in this manner, the adaptive filter may start from a baseline estimate of the external feedback path that limits the range of potential feedback changes, thereby allowing the hearing device to process the signal using a complex adaptive filter.

The initial value of the filter parameter(s) may depend on an acoustic environment in which the hearing prosthesis operates. The acoustic environment may in turn depend on ambient sounds and perhaps changes in an external feedback path, which may result from the recipient putting on or taking off a hat, putting his or her hand near the hearing device, using a telephone, etc. Based on the determined acoustic environment, the hearing device may select one of a plurality of environmental classifiers, with each environmental classifier corresponding to a particular acoustic environment and a particular set of initial filter parameters. Such initial filter parameters may be predetermined, perhaps during a fitting procedure. For instance, each set of initial parameters may be based on one or more recipient-specific measurements of the feedback signal path.

Additionally, a hearing device operating in accordance with the disclosure may also use adaptive signal modeling to pre-filter input audio signals and output audio signals. Pre-filtering may decorrelate an input audio signal and an output audio signal, which are typically highly correlated in linear closed-loop audio systems. By decorrelating the input audio signal and the output audio signal, the hearing device may more accurately predict changes in the input audio signal that are due to undesirable signal components, and the predicted changes can then be used to update one or more filter parameters. In this manner, the hearing device may more effectively suppress or remove undesirable signal components in the input audio signals.

To pre-filter the audio signals, the hearing device may select one of a plurality of source signal models based on the selected environmental classifier. Rather than using a predetermined source signal model, selecting the source signal model based on the acoustic environment may allow for more accurate source signal modeling, as one source signal model may provide in a given acoustic environment a better model of the source signal than another source signal model. Using an acoustic-environment based source signal model may also allow the hearing device to more accurately predict changes in the input audio signal caused by undesirable signal components.

The present disclosure may provide a number of benefits over other filtering methods used in hearing prostheses. For instance, using adaptive sound source modeling (e.g., sound source modeling based on the acoustic environment) may allow for faster model adaptation without sacrificing sound quality. As another example, implementing a Kalman filter to filter feedback artifacts can allow the total system gain increases of up to 15 dB per frequency channel. Such gain increases could improve the performance of the hearing device at different frequencies, thereby enhancing the recipient's ability to perceive sounds.

Accordingly, in one respect, a method is disclosed. The method includes, based at least in part on an environmental classifier, selecting a sound source model from a plurality of sound source models. Here, each sound source model provides an estimate of a sound signal in at least one of a plurality of acoustic environments, and the environmental classifier is indicative of an acoustic environment in which a microphone receives sound. The method also includes using the selected sound source model to update a parameter of a filter. Additionally, the method includes processing an input audio signal provided by the microphone to generate an output audio signal, with processing the input audio signal including using the updated filter parameter to filter the input audio signal with the filter. The method further includes causing an output transducer to provide an output that is based on the output audio signal.

In another respect, a sound processor is disclosed. The sound processor is configured to receive from a microphone a first audio input signal and a second audio input signal, with the microphone receiving the first audio input signal before the second audio input signal. The sound processor is also configured to determine an updated parameter of a Kalman filter. Here, determining the updated parameter includes the sound processor using an adaptive signal model to (i) pre-filter the first input audio signal to provide a pre-filtered input audio signal, and (ii) pre-filter a first output signal to provide a pre-filtered output audio signal. Further, the sound processor is configured to, using the updated parameter, filter the second audio input signal with the Kalman filter to provide a filtered source signal. And the sound processor is configured to cause an output transducer to provide an output, wherein the output is based at least in part on the filtered source signal.

In yet another respect, a hearing device system is disclosed. The hearing device system includes a microphone configured to generate a first audio signal based on sound received from an acoustic environment in which the hearing device operates, an output transducer configured to stimulate a recipient of a hearing device, and a sound processor. The sound processor is configured to (i) filter a first sample of the audio input signal using a Kalman filter to provide a first filtered audio input signal, with the dynamic range of the Kalman filter being limited by an initial value of an estimated signal path covariance; (ii) process the first filtered audio signal to provide a output audio signal; and (iii) cause the output transducer to deliver a stimulus to the recipient, wherein the stimulus is based at least in part on the output audio signal.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE FIGURES

FIG. 6B is a flow diagram of an example method for implementing a Kalman filter in a hearing device.

DETAILED DESCRIPTION

The following detailed description describes various features, functions, and attributes of the disclosed systems, methods, and devices with reference to the accompanying figures. In the figures, similar symbols typically identify similar components, unless context dictates otherwise. The illustrative embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Figure 1A:
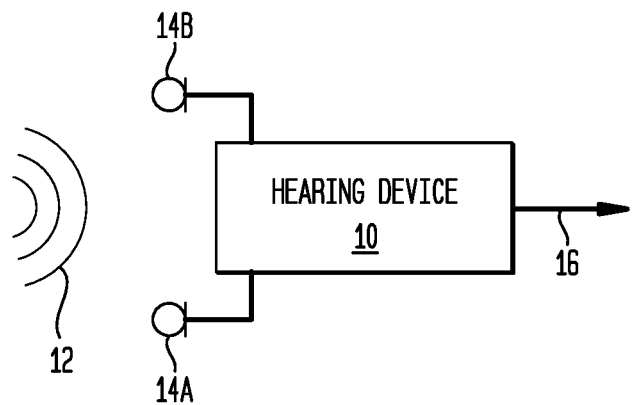
FIG. 1A is a block diagram of a hearing device, according to an example.

Referring now to the drawings, FIG. 1A is a simplified block diagram of a hearing device 10. A recipient who suffers from conductive hearing loss, and/or possibly some sensorineural hearing loss, may utilize the hearing device 10 to assist the recipient in perceiving at least a portion of a sound 12. At a basic level, the hearing device 10 receives a sound 12 at microphones 14A and 14B, and processes the received sound to generate a stimulus 16, which is delivered to one or more body parts in an auditory pathway of the recipient. As used herein, the term "auditory pathway" refers to body parts in a human (or other mammalian) body, such as a portion of the skull, an ossicular chain, a cochlea, and an auditory nerve, that, when stimulated, cause the recipient to perceive at least a portion of a sound. Delivering the stimulus 16 to the body part in the auditory pathway may thus allow the recipient to perceive at least a portion of the sound 12.

To process the sound 12, the hearing device 10 includes a sound processor. In a typical implementation, the sound processor receives the sound 12 from the microphones 14A, 14B as input audio signals, which the sound processor may then process by performing a plurality of sound-processing functions, such as filtering, beamforming, mixing, noise-reduction, frequency shaping, or adaptive gain control for example. The sound processor may thus generate an output audio signal, which the sound processor can further process to generate a stimulation signal usable by an output transducer to generate the stimulus 16. Alternatively, the hearing device 10 may include a plurality of sound processors that each performs one or more of the described general functions of the sound processor.

With respect to filtering, the sound processor may implement one or more filters to remove undesirable sound components from the input audio signals. A feedback artifact is one such example of an undesirable sound component. Because a distance between the microphones 14A, 14B and an output transducer of the hearing device 10 (e.g., an anchor system in a bone conduction device or an acoustic actuator in a middle ear implant or an acoustic hearing prosthesis) is typically no greater than several centimeters, the hearing device 10 may be susceptible to feedback. Feedback can cause the recipient to perceive a tone, or "howling," at one or more frequencies. As a result, feedback can inhibit the recipient's ability to perceive sounds. Feedback can also damage components of the hearing device, thereby further inhibiting the recipient's ability to perceive sounds for a potentially prolonged time period.

Figure 1B:
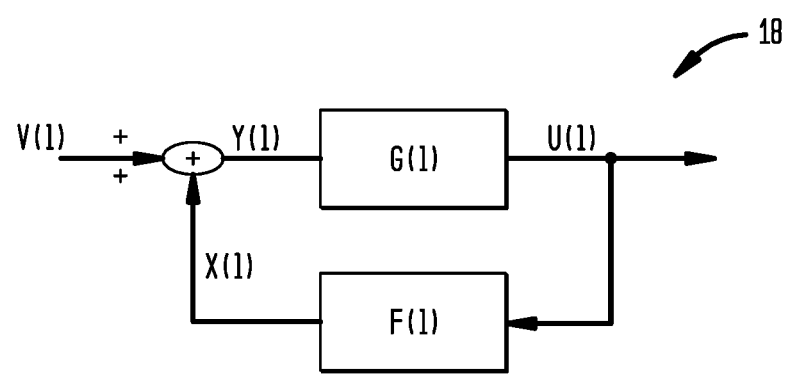
FIG. 1B is a functional block diagram of an external feedback system that includes the hearing device depicted in FIG. 1A, according to an example.

FIG. 1B is a simplified block diagram of an external feedback system 18, which is one example of an external feedback loop that occurs when the hearing device 10 processes the sound 12. In FIG. 1B, the sound 12 and the stimulus 16 are mathematically represented as a frequency-domain sound signal V(l) and a frequency domain stimulus U(l), respectively, with l being a discrete frequency correlating to one of M frequency channels, and with l and M both being real integers (e.g., l=0, 1, . . . , M−1).

As shown in FIG. 1B, the hearing device 10 may receive an input audio signal Y(l). Due to external feedback, the input audio signal Y(l) may include the sound signal V(l) as well as a feedback signal X(l), which derives from the stimulus signal U(l). Accordingly, the input audio signal Y(l) can be mathematically described by equation 1:

$$Y(l)=V(l)+X(l)=V(l)+U(l)\cdot F(l) \qquad (1)$$

where F(l) is an unknown external transfer function of the external feedback system 18. The hearing device 10 may process the input signal Y(l) such that the transformed stimulus U(l) is given by the equation 2:

$$U(l) = Y(l)\cdot G(l) = \frac{V(l)\cdot G(l)}{1 - G(l)\cdot F(l)} \qquad (2)$$

where G(l) is an internal transfer function representing the approximate gain applied by the hearing device 10 to the sound signal V(l) when sound processing functions. Ideally, the value of the external transfer function F(l) is near-zero, and thus the product of the internal transfer function G(l) and the external transfer function F(l) is also near zero. But under certain conditions and at certain frequency channels, the value of F(l) may increase to the point where the product of the transfer functions approaches one, thereby causing the stimulus signal U(l) to become unstable (i.e., approaches infinity), which may result in the stimulus signal U(l) including audible feedback.

Figure 2:
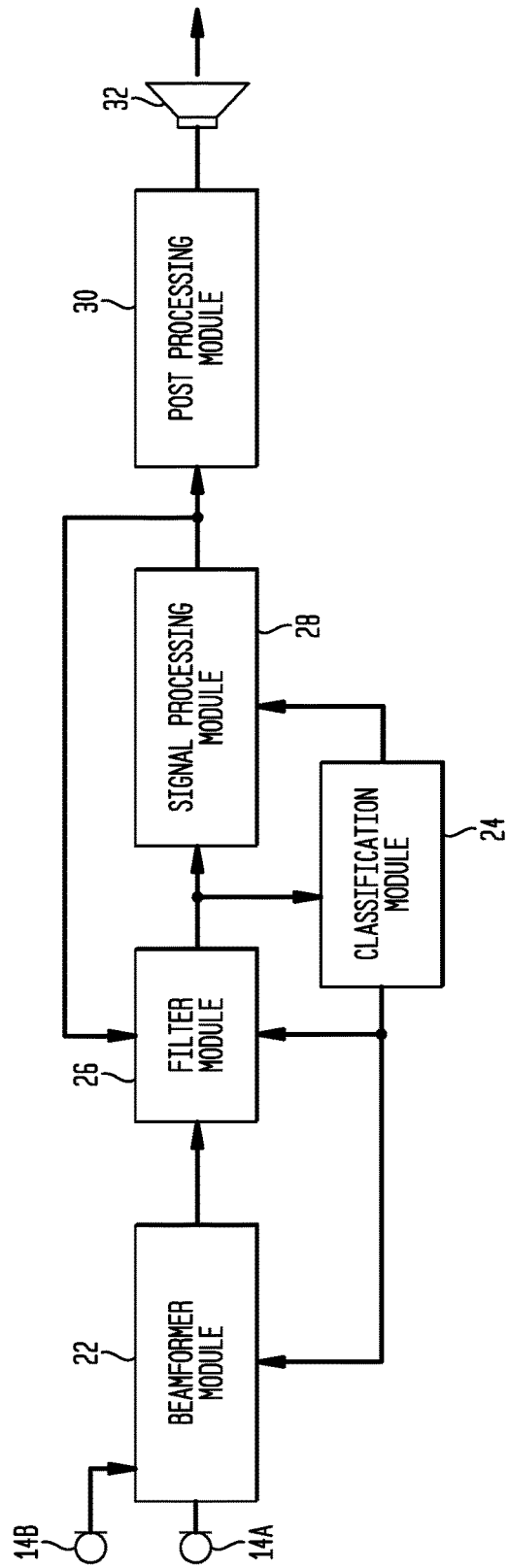
FIGS. 2 and 3 are block diagrams of example hearing device systems.

FIG. 2 shows a block diagram of an example hearing device system 20A configured to implement an adaptive filter in accordance with the present disclosure. As depicted, the hearing device system 20A includes the first microphone 14A, the second microphone 14B, a beamformer module 22, a classification module 24, a filter module 26, a signal processing module 28, a post-processing module 30, and an output transducer 32. A single sound processor may implement one, some, or all of the modules depicted in FIG. 2.

In an example implementation, the classification module 24 determines an acoustic environment based at least in part on a number of samples of a filtered output signal (e.g., the output of the filter module 26). The environmental classifier may provide an indication of an acoustic environment in which the hearing device 10 operates at a given time. By way of example, the acoustic environment may be based on ambient noise as well as an activity of the recipient that effects an external feedback path (e.g., talking on a phone, wearing/not wearing a hat, placing a hand near the hearing device, etc.).

To determine the environmental classifier, the classification module 24 processes a filtered audio signal to identify changes in one or more characteristics of the filtered audio signal, such as energy levels and estimated noise levels at each of a plurality of frequencies. Based on the identified changes, the classification module may select one of a plurality of environmental classifiers, with the selected environmental classifier being the closest match to the new acoustic environment. In some example, the classification module 24 may select the environmental classifier based on a value of a filter parameter received from the filter module 26.

In response to receiving a sound from the environment, such as the sound 12, the microphones 14A and 14B may generate a first input audio signal and a second input audio signal, respectively, each of which is a signal representing the received sound. The beamformer module 22 may receive the first input audio signal and the second input audio signal, as well as an environmental classifier from the classification module 24. Based on the received environmental classifier, the beamformer module 22 may select one of a plurality of beamforming algorithms, each of which provides a specific type of beamforming. For example, the beamformer module 22 may select one beamforming algorithm when the environmental classifier correlates to a situation in which the recipient is conversing with another person in a quiet acoustic environment but could select a different beamforming algorithm if the environmental classifier indicates that the recipient is a noisy acoustic environment. Based on the selected beamforming algorithm, the beamformer module 22 may combine the first input audio signal and the second input audio signal to generate a combined audio input signal that is optimized for the identified acoustic environment.

The filter module 26 may receive and filter the combined audio signal to generate the filtered audio signal. To this end, the filter module 26 may implement one or more static filters and/or adaptive filters, with each filter being configured to reduce or remove an undesirable signal component. By way of example, the filter module 26 may implement filters configured to perform functions such as feedback cancellation, echo cancellation, noise reduction, or the like. In one example, the filter module 26 implements each filter as a frequency-domain filter, although the filter module 26 may implement one or more time-domain filters in other examples.

In some examples, the filter module 26 may select one or more filters with which to generate the filter audio signal based in part on the environmental classifier received from the classification module 24. And consistent with the above description, the filter module 26 may select one or more initial parameters of an adaptive filter (or, in some cases, of a static filter) based on the selected environmental classifier. Further, the filter module 26 could use the output audio signal to filter the combined audio input signal, such as when employing an adaptive (or static) feedback cancellation filter, for example.

In addition to filtering audio input signals to generate filtered audio signals, the filter module 26 may also periodically update one or more filter parameters. In accordance with this disclosure, the filter module 26 may select, based on the received environmental classifier, one of a plurality of sound source models, and the filter module 26 may use the selected sound source model to pre-filter the input audio signal(s) and output audio signals. The filter module 26 may then use the pre-filtered audio signals to determine a pre-filtered source signal, which the filter module 26 may then use, perhaps in combination with previously determined pre-filtered signals, to determine updates to one or more filter parameters. By way of example, such filter parameters could include a step-size of the adaptive filter, weight-matrices that provide frequency-dependent regularization or assign different importance values to different frequency channels or power spectral densities of an estimated feedback path. The filter module 26 may also determine a value of a parameter based on the environmental classifier. For example, the filter module 26 implementing an adaptive feedback cancellation filter may select, based on the environmental classifier, a value of a parameter that accounts for dynamic changes in the external feedback path.

The signal processing module 28 may receive the filtered audio signal from the filter module 26 and may generate an output audio signal by performing one or more sound processing functions on the filtered audio signal. By way of example, such sound processing functions may include an adaptive gain function, a noise-reduction function, a frequency-shaping function, a compression function, a volume control function, a direct current filtering function, and/or the like. In some examples, at least one of the one or more sound processing functions may depend on the acoustic environment. To this end, the signal processing module 28 may also receive the environmental classifier from the classification module 24, and the signal processing module 28 may then use the received environmental classifier to select the appropriate parameters for one or more sound processing functions. In order to implement one or more sound processing functions in the frequency domain, the signal processing module 28 may perform a fast Fourier transform (FFT) function to transform the time-domain combined audio input signal to a frequency-domain signal, as well as an inverse FFT function to provide a time-domain audio output signal from a frequency-domain signal.

The post-processing module 30 may process the output audio signal to provide an output signal usable by the output transducer 32 for generating and delivering the stimulus 16 to the recipient. Note that in some examples, such as when the output transducer 32 is an electroacoustic transducer, the hearing device system 20A may not include the post-processing module 30, and the output transducer 32 may generate the stimulus 16 directly from the output audio signal.

Figure 3:
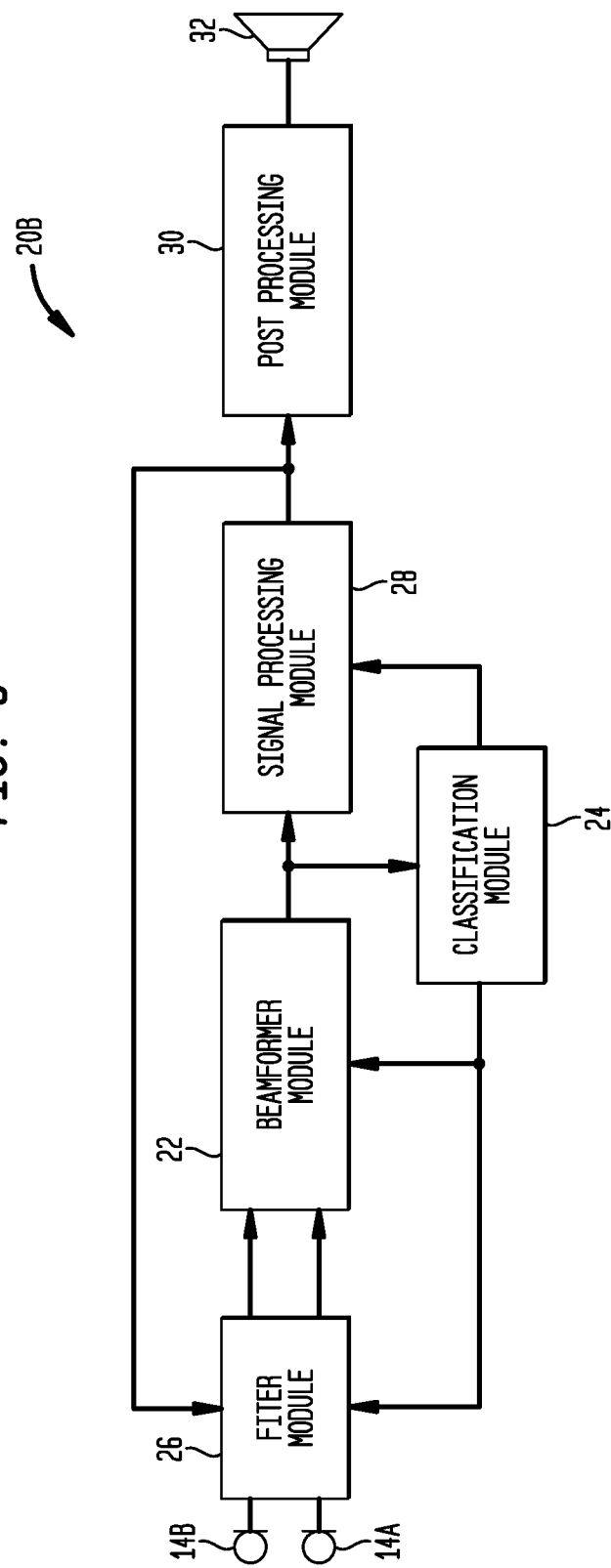

While FIG. 2 shows one example arrangement of the components of the hearing device system 20A, other examples are possible as well. For instance, FIG. 3 shows an alternative arrangement 20B in which the filter module 26 is located between the microphones 14A, 14B and the beamformer module 22. In this example, the filter module 26 may receive the input audio signals directly from the microphones 14A and 14B, which may advantageously allow the filter module 26 to remove undesirable signal components from the input audio signals prior to beamforming, thereby minimizing the potentially adverse effects of performing beamforming operations on such undesirable signal components.

In the hearing device 20B, the filter module 26 may process the input audio signal from the first microphone 14A (e.g., the forward microphone) as described with respect to FIG. 3. For the input audio signal received from the second microphone 14B (e.g., the rear microphone), the filter module 26 may apply a predetermined normalization factor, which may account for differences between the feedback paths for microphones 14A, 14B, which are relatively small due to the proximity of the microphones 14A and 14B to each other. By way of example, a normalization factor may be determined or derived from recipient-specific fitting data for each of a plurality of acoustic environments, and each environmental classifier may thus correlate to a particular, predetermined normalization factor. The filter module 26 may then select a normalization factor based at least in part on the selected environmental classifier. Alternatively, the filter module 26 may use a separate model to filter the second input audio signal.

Figure 4:
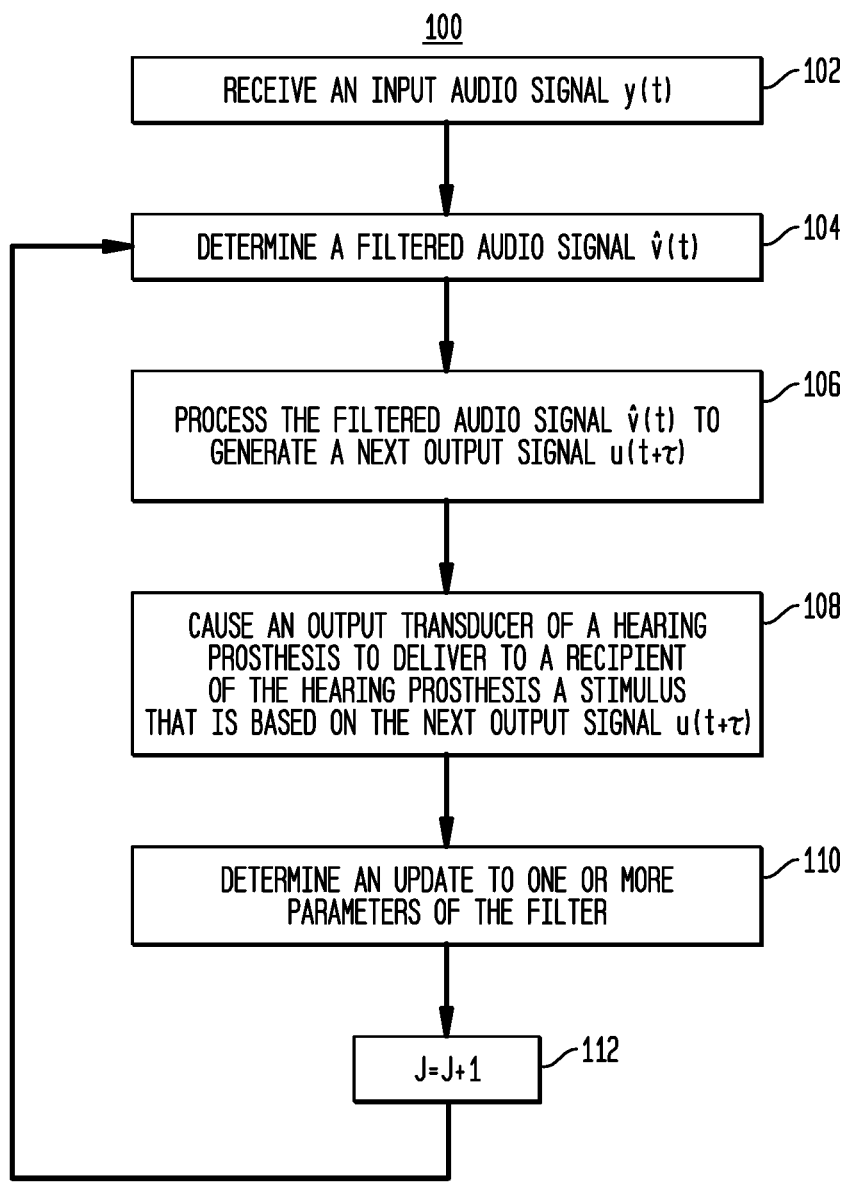
FIG. 4 is a flow diagram of an example method for causing an output transducer to provide a stimulus.

Turning now to FIG. 4, a flow diagram of a method 100 is shown. The method 100 is one example for generating an output signal that is based at least in part on a filtered audio signal. For illustrative purposes, the method 100 and other methods of the disclosure are described as being implemented by a hearing device system that includes an adaptive feedback cancellation filter. But in other examples, a hearing device system may implement the method 100 (or portions of the method 100) using a different type of filter, such as a filter configured for echo cancellation or for noise-reduction.

To further describe the functions performed by a hearing device implementing the method 100, reference is made below to equations that mathematically describe example operations that can be performed by components of the hearing device system 20. In the equations and accompanying explanation, functions with lower case letters represent time-domain signals, functions with capital letters represent frequency-domain signals, and bolded letters represent vector matrices.

Figure 5A:
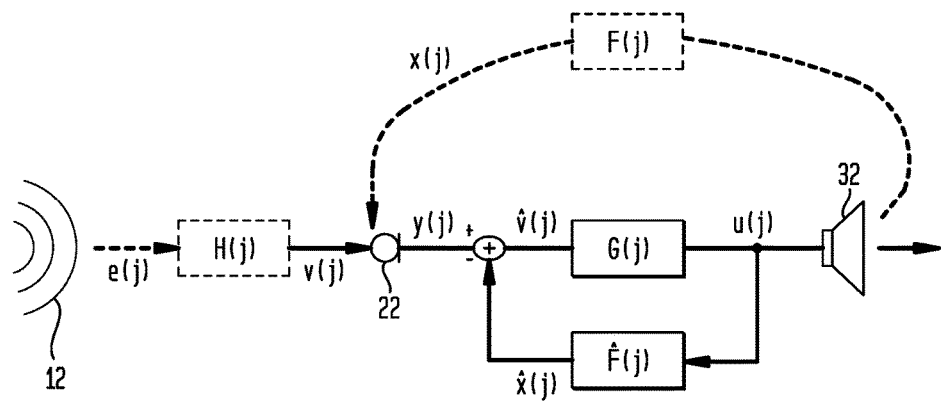
FIG. 5A is a block diagram of a model for processing an audio signal in a linear closed-loop system, according to an example.

Additionally, a visual representation of some of the operations of the method 100 is shown in FIG. 5A, which depicts a block diagram of a linear, closed-loop, stochastic state-space model of the an audio processing system, such as the hearing device systems 20A and 20B. For illustrative purposes, the first microphone 14A, the second microphone 14B, and the beamformer module 22 are depicted as a single microphone 14. Also for illustrative purposes, the output transducer 32 is depicted as a speaker. In this case, the output transducer 32 outputs the audio output signal as an acoustic stimulus, which may be fed back to the microphone 14. It should be noted, however, that the method 100 is not limited to systems where acoustic feedback is possible. For instance, a hearing device may implement the method 100 in linear closed-loop system susceptible to mechanical feedback (e.g., where vibration stimuli are received by a microphone or other audio transducer) or electrical feedback (e.g., where electrical stimuli are received by a microphone or other audio transducer).

Beginning at block 102, the method 100 includes receiving an input audio signal y(t), where t represents time. The hearing device may implement the adaptive filter as a frequency-domain filter, which may allow for reduced filter complexity, faster filter convergence, and the use of frequency-dependent step-sizes. As one example, the hearing device could implement the filter using a partitioned-block frequency-domain method, which may minimize the processing delay for implementing the filter in a hearing device.

For purposes of illustrating the implementation of a frequency-domain filter, the time variable t is replaced with the variable j, which is a real integer that represents a discrete time index for a frame (or sample) of the input audio signal at a particular point in time. In examples in which the adaptive filter is implemented in the time domain, t may be used for functions of time instead of discrete time indices.

Next at block 104, the method 100 includes determining a filtered audio signal $\hat{v}(j)$. As shown in FIG. 5A, the input audio signal y(j) includes a source signal v(j), which represents a sound received from the acoustic environment, and a feedback signal x(j). The feedback signal x(j), in turn, is the signal that results from the convolution of an output signal u(j) and an external feedback transfer function $f(j,i)$ such that:

$$y(j)=v(j)+x(j)=v(j)+f(j,i)*u(j), \quad (3)$$

where * denotes a convolution operation, and i indexes the elements of a function at a time t corresponding to a time index (e.g., in equation 3, at the time t corresponding to the time index j). The goal of the adaptive feedback filter then is to minimize, if not eliminate, the feedback signal x(j).

To this end, the hearing device may determine an estimated feedback signal $\hat{x}(j)$, which the hearing device may then subtract from the input audio signal y(j) to generate a filtered audio signal $\hat{v}(j)$, as shown in equation 4:

$$\hat{v}(j)=y(j)-\hat{x}(j). \quad (4)$$

In one example, the adaptive filter is a frequency-domain filter. To determine the estimated feedback signal $\hat{x}(j)$, the hearing device may determine, for a plurality of frames, a frequency-domain representation of the output audio signal u(j) according to the following equation:

$$U(j)=\text{diag}\{F_M[u(jR-M+1),\ldots,u(jR)]^H\}, \quad (5)$$

where $F_M$ is an M×M Fourier matrix, M is a positive integer representing the number of frequency channels, R is a frame shift, and the superscript H signifies a Hermititan transposition. The hearing device may then determine the estimated feedback signal $\hat{x}(j)$ using equation 6:

$$\hat{x}(j)=Q^H F_M^{-1} U(j)\hat{F}(j), \quad (6)$$

where Q is an M×R projection matrix of an R×R identity matrix $I_R$ (i.e., $Q=(0\ I_R)^H$), and $\hat{F}(k)$ is the estimated frequency-domain feedback transfer function. Having determined the estimated feedback signal $\hat{x}(t)$, the hearing device may determine the filtered audio signal $\hat{v}(t)$ using equation 4.

Continuing at block 106 in FIG. 4, the method 100 includes processing the filtered audio signal to generate a next output audio signal. To process the filtered audio signal $\hat{v}(t)$, the hearing device may perform on the filtered audio signal $\hat{v}(t)$ a plurality of sound-processing functions, such as the sound-processing functions described above with respect to the signal processing module 28, thereby generating the output audio signal u(t+τ), which is shown in equation 7:

$$u(t+\tau)=\hat{v}(t)*g(t,i), \quad (7)$$

where τ is a time shift that accounts for internal processing delay (assuming that τ is an integer, t in equation 7 can be replaced with j), and g(j,i) is the time-dependent gain resulting from the sound-processing functions performed by the hearing device. Note the time-dependent gain g(j,i) accounts for the actual gain applied to the filtered audio signal $\hat{v}(t)$ during linear sound-processing operations as well as estimated gains applied to the filtered audio signal $\hat{v}(t)$ during non-linear sound-processing operations.

The method 100 next includes causing an output transducer of the hearing device to deliver to a recipient of the hearing device a stimulus that is based on the next output audio signal u(t+τ), at block 108. When performing the functions of block 108, the hearing device may provide the audio output signal directly to the output transducer 32. Alternatively, the hearing device may include a post-processing module, such as the post processing module 30 described with respect to FIG. 2, in order to generate an output signal usable by an electromechanical or electrical hearing device to generate one or more stimuli.

The closed-loop short-term frequency response of the hearing system, or the frequency-dependent gain applied to the sound signal v(t), is given by equation 8:

$$\frac{U(j+\tau)}{V(j)} = \frac{G(j)}{1-G(j)[F(j)-\hat{F}(j)]}, \quad (8)$$

where U(j) is the frequency-domain audio output signal, V(j) is the frequency-domain sound signal, G(j) is the frequency-domain gain transfer function (e.g., the frequency-dependent gain applied by the signal processing module 26), F(j) is the actual frequency-domain feedback transfer function, and $\hat{F}(j)$ is the estimated frequency-domain feedback transfer function. Thus, for a given frequency channel, the closer the estimated frequency-domain feedback transfer function is to the actual frequency-domain feedback transfer function, the closer the closed-loop short-term at a given frequency response of the system is to the frequency-domain gain transfer function.

Figure 5B:
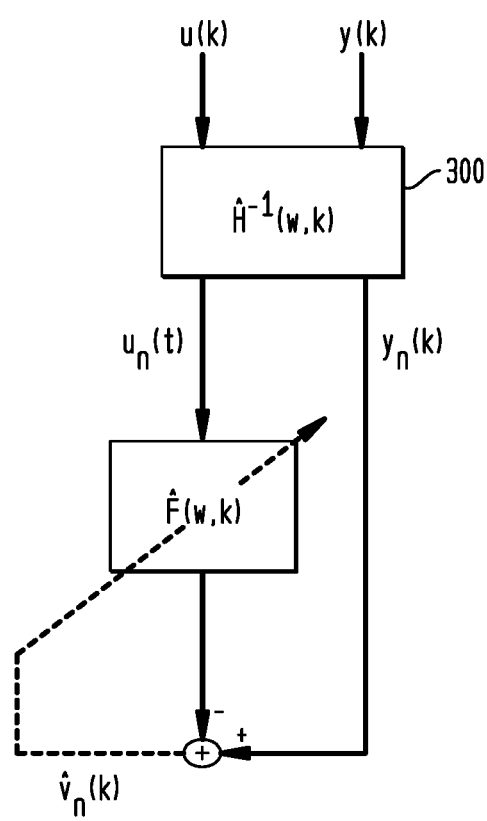
FIG. 5B is a block diagram of a model for updating a filter implemented in the linear closed-loop system depicted in FIG. 5A, according to an example.
Figure 6A:
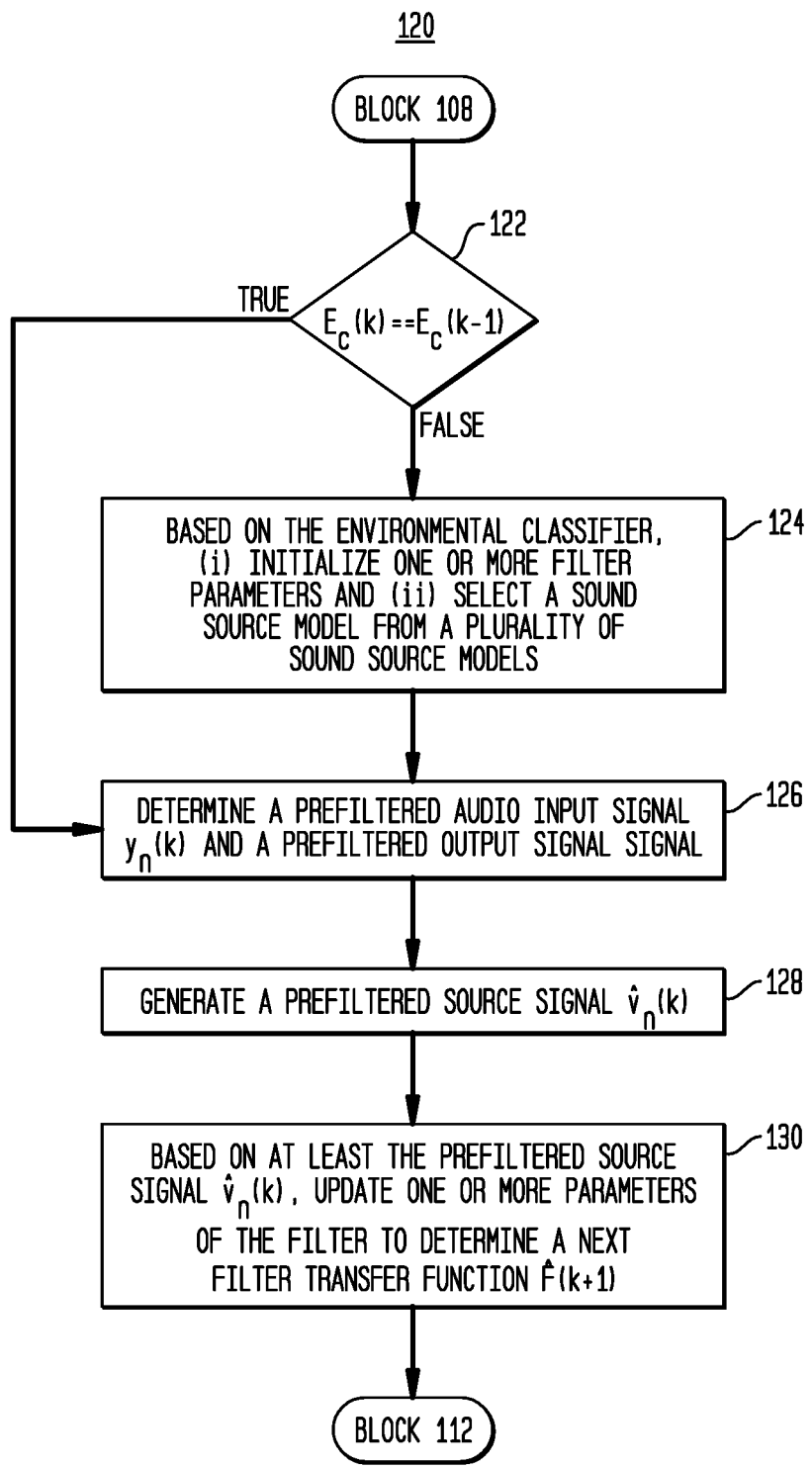
FIG. 6A is a flow diagram of an example method for updating a filter parameter using adaptive sound source modeling.

At block 110, the method 100 includes determining an update to one or more parameters of an adaptive filter. In performing the functions of block 110, the hearing device may use adaptive signal modeling to determine updates to one or more parameters of the adaptive filter. FIG. 6A is a flow diagram of a method 120, which is one example method for updating a parameter of an adaptive filter using adaptive signal modeling. A visual representation of some of the operations of the method 120 is shown in FIG. 5B.

In accordance with the disclosure, the hearing device may select, based on an environmental classifier, one of a plurality of sound source models, with the selected sound source model providing a prediction of a next value of the source signal v(t). By way of example, a given sound source model may estimate the source audio signal v(t) as a white noise signal e(t) convoluted with a time-varying model h(t,i), as shown in equation 9:

$$v(t)=e(t)*h(t,i) \quad (9)$$

As a result, the white noise signal is given according to equation 10:

$$e(t)=v(t)*h^{-1}(t,i), \quad (10)$$

where $h^{-1}(t,i)$ is the inverse time-varying sound source model. Since different sound source models will provide different estimates of e(t), the hearing device may select the sound source model that most closely matches the current acoustic environment. To this end, the hearing device may select the sound source model based on the environmental classifier.

The method 120 thus begins at a discrete time index k with making a determination of whether an environmental classifier $E_c$ has changed, perhaps using equation 11:

$$E_c(k)=E_c(k-1), \quad (11)$$

If the hearing device determines that equation 11 is true, then the method 120 continues at block 126. But if the hearing device determines that equation 11 is false, then the method 120 continues at block 124, where, based on the environmental classifier, the hearing device (i) initializes one or more parameters of the adaptive filter and (ii) selects a sound source model from a plurality of sound source models. In line with the above discussion, initializing the one or more parameters of the filter with recipient-based feedback measurements helps ensure that the initial output of the filter is based on a measured feedback path, thereby allowing the hearing device to implement filters that would otherwise require a dynamic range in excess of the hearing device's capabilities.

Note that the hearing device may perform the functions (or a portion of the functions) of block 124 when the hearing device first begins to process input audio signals (e.g., when the hearing device is turned on). For instance, the hearing device may initially select a default environmental classifier and perform the functions of block 124 based on the default environmental classifier. Once the hearing device has processed enough samples of the input audio signal to determine an environmental classifier, the hearing device may then perform the functions of block 124 when the result of block 122 is false.

Next at block 126, the method 120 includes determining a pre-filtered input audio signal $y_h(k)$ and a pre-filtered output audio signal $u_h(k)$, where k is a real integer that represents a discrete frame index. Pre-filtering may decorrelate the audio signals y(k) and u(k) from the source signal v(k), thereby allowing the hearing device to better estimate the changes in the input audio signal y(k) that are due to undesirable signal components, such as feedback artifacts.

Based on the selected sound source model, the hearing device may determine an estimated inverse sound source impulse response $\hat{h}^{-1}(t,i)$. For illustrative purposes, the estimated inverse sound source impulse response $\hat{h}^{-1}(t,i)$ can be simplified as being a function of k as $\hat{h}^{-1}(k)$. Since the source signal v(k) is not a white noise signal, the hearing device may periodically update the inverse sound source transfer function $\hat{h}^{-1}(k)$ based on two or more previously determined filtered audio signals (e.g., $\hat{v}(k), \hat{v}(k-1)$). The hearing device may then determine the pre-filtered input audio signal $y_h(k)$ and a pre-filtered output audio signal $u_h(k)$ by determining the convolution between the inverse sound source transfer function $\hat{h}^{-1}(k)$ and the input audio signal y(k) and the output audio signal u(k), respectively, as expressed in equations 12 and 13:

$$y_h(k)=y(k)*\hat{h}^{-1}(k) \quad (12)$$

$$u_h(k)=u(k)*\hat{h}^{-1}(k) \quad (13)$$

It should be noted that the estimated inverse sound source impulse response $\hat{h}^{-1}(t,i)$ at the time t corresponding to the time index k could be implemented as a transfer function.

Continuing at block 128, the method 120 includes determining a pre-filtered source signal $\hat{v}_h(k)$. Here, the hearing device may determine the pre-filtered feedback estimate $\hat{x}_h(k)$ by filtering the decorrelated output audio signal $u_h(k)$ with the feedback filter in the frequency domain, as shown in equations 14 and 15:

$$U_h(k)=\text{diag}\{F_M u_h(k)\} \quad (14)$$

$$\hat{x}_h(k)=Q^H F_M^{-1} U_h(k) \hat{F}(k) \quad (15)$$

The hearing device may then determine the pre-filtered source signal $\hat{v}_h(k)$ by calculating a difference between the pre-filtered audio input signal $y_h(k)$ and the pre-filtered feedback estimate $\hat{x}_h(k)$, as shown in equation 16:

$$\hat{v}_h(k)=y_h(k)-\hat{x}_h(k). \quad (16)$$

Based on at least the pre-filtered source signal $\hat{v}_h(k)$, the method 120 includes updating one or more parameters of the filter to determine an updated filter transfer function $\hat{F}(k+1)$, at block 130. When performing the functions of block 130, the hearing device may first convert the pre-filtered source signal $\hat{v}_h(k)$ to the frequency domain using equation 17:

$$\hat{V}_h(k)=F_M Q \hat{v}_h(k) \quad (17)$$

From the frequency-domain pre-filtered source signal $\hat{V}_h(k)$, the hearing device may determine a frequency-domain adaptive step size μ(k) for the adaptive filter, as shown in equation 18:

$$\text{diag}\{\mu(k)\} = \frac{W_2(k)}{U_h(k)W_2(k)U_h^H(k)+W_1(k)} \quad (18)$$

where $W_1(k)$ is a weight matrix that provides frequency-dependent regularization, and $W_2(k)$ is a weight matrix that assigns different importance values to each of the M frequency bins of the decorrelated audio output signal $U_h(k)$. The hearing device can then determine the updated feedback filter transfer function $\hat{F}(k+1)$ using equation 19:

$$\hat{F}(k+1)=\lambda[\hat{F}(k)+F_M[I_M-QQ^H]F_M^{-1}\cdot\text{diag}\{\mu(k)\}U_h^H(k)\hat{V}_h(k)] \quad (19)$$

where λ accounts for changes in the feedback path f(k), and $I_M$ is an M×M identity matrix.

The values of λ, $W_1(k)$, and $W_2(k)$ depend, in turn, on the type of adaptive filter implemented by the hearing device. By way of example, the hearing device may implement the adaptive filter as a normalized least mean squares filter (NLMS). Advantageously, implementing an NLMS filter using the method 120 may improve the speed at which the filter converges, thereby enhancing the recipient's experience.

In one example, the hearing device may implement an NLMS filter) using the set of parameters shown in equation 20:

$$\lambda = 1$$

$$W_1(k) = \alpha I$$

$$W_2(k) = I \quad (20)$$

where I is an identity matrix, and α is a frequency independent regularization factor. In another example, the hearing device may implement the adaptive filter as a proportionate NLMS filter. In this case, the values of λ, $W_1(k)$, and $W_2(k)$ are given as a set in equation 21:

$$\lambda = 1$$

$$W_1(k) = \alpha I$$

$$W_2(k) = D(k) \quad (21)$$

where D(k) is a gain matrix that can be determined using any technique now known or later developed. As yet another example, the hearing device may implement the adaptive filter as a Levenberg-Marquardt regularized NLMS using the parameters set forth in equation 22:

$$\lambda = 1$$

$$W_1(k) = \mathbb{E}\{\hat{e}(k)\hat{e}^T(k)\}$$

$$W_2(k) = \mathbb{E}\{(f(k)-f_0)(f(k)-f_0)^T\} \quad (22)$$

where with $f_0 = \mathbb{E}\{f\}$ and $\mathbb{E}\{\hat{e}(k)\} = 0$, the superscript $T$ is the matrix transpose operator, $f_0$ is the initial value of the feedback path measured during fitting, and the estimated value of ê(k) (i.e., the white noise sound estimated by the inverse sound source model) can be determined using any technique now known or later developed.

In still another example, the hearing device may implement the adaptive filter as a Kalman filter. In this example, the hearing device may determine one or more parameters specific to the Kalman filter. FIG. 6B is a flow diagram of a method 140, which includes functions that a hearing device can perform when performing the functions of block 130 to update a Kalman filter.

Beginning at block 142, the method 140 includes determining an estimated sound source power spectral density $\hat{\Phi}_{ee}(k)$ having a minimum value that is based on a variance of the pre-filtered source signal $\sigma_{\hat{v}_h}^2(k)$. The hearing device may determine the frequency-specific estimated power spectral density $\hat{\Phi}_{ee}(k)$ according to equation 23:

$$\hat{\Phi}_{ee}(k) = \hat{\Phi}_{\hat{v}_h \hat{v}_h}(k) - \hat{\Xi}_{f_r f_r}(k) \cdot |U_h(k)|^2 \quad (23)$$

where $\hat{\Phi}_{\hat{v}_h \hat{v}_h}(k)$ is an estimated power spectral density of the frequency-domain pre-filtered source signal $\hat{V}_h(k)$, $f_r(k) = f(k) - \hat{f}(k)$ is the difference between true and estimated feedback path, and $\hat{\Xi}_{f_r f_r}(k)$ is the estimated spectral convergence-state of the estimated feedback path. The hearing device can in turn determine the estimated power spectral density of the frequency-domain pre-filtered source signal $\hat{\Phi}_{\hat{v}_h \hat{v}_h}(k)$ using equation 23:

$$\hat{\Phi}_{\hat{v}_h \hat{v}_h}(k) = \frac{|\hat{V}_h(k)|^2}{R} \quad (24)$$

From equation 24, equation 23 can be rewritten in scalar form:

$$\hat{\Phi}_{ee}(l,k) = \frac{|\hat{V}_h(l,k)|^2}{R} - \hat{\Xi}_{f_r f_r}(l,k) \cdot |U_h(l,k)|^2 \quad (25)$$

To ensure that the feedback filter converges when the estimated power spectral density $\hat{\Phi}_{ee}(l,k)$ for a given frequency bin is low (or possibly negative), the hearing device may determine a variance of $\hat{v}_h(k)$ (i.e., $\sigma_{\hat{v}_h}^2(l,k)$), from which the hearing device may use to determine a lower limit for $\hat{\Phi}_{ee}(l,k)$.

The method 140 then includes determining the adaptive step-size and the next feedback filter transfer function $\hat{F}(k+1)$, at block 144 and 146, respectively. For Kalman filter implementations, the hearing device may use set of parameters in equation 26 when performing the functions of blocks 144 and 146:

$$\lambda = A$$

$$W_1(k) = \hat{\Phi}_{ee}(k)$$

$$W_2(k+1) = P(k+1) \quad (26)$$

where P(k+1) is a next feedback path error covariance, and A is a transition variable that allows for slower or faster convergence of the Kalman filter. The value of A may depend in part on the selected environmental classifier, as the gain the hearing device applies to the filtered audio signal $\hat{v}(k)$ may vary depending on the selected environmental classifier. The value of A may thus allow for faster or slower convergence of the Kalman filter without producing feedback artifacts in subsequently received input audio signals. In one example, the value of A may be based on recipient-specific fitting data. And in another example, the value of A may be a function of time (e.g., $\lambda(k) = A(k)$).

The hearing device may determine the adaptive step-size and the next feedback filter transfer function $\hat{F}(k+1)$ using Kalman filter-specific versions of equations 17 and 18, respectively, which are shown in equations 27 and 28:

$$\mu(k) = \frac{\hat{\Xi}_{f_r f_r}(k)}{\hat{\Xi}_{f_r f_r}(k)|U_h(k)|^2 + \hat{\Phi}_{ee}(k)} \quad (27)$$

$$\hat{F}(k+1) = A\big[\hat{F}(k) + F_M[I_M - QQ^H]F_M^{-1}\Delta\hat{F}(k)\big] \quad (28)$$

where $\Delta\hat{F}(k)$ is an estimated process noise signal, which is in turn expressed in equation 29:

$$\Delta\hat{F}(k) = \text{diag}\{\mu(k)\}U_h^H(k)F_M Q\hat{v}_h(k) \quad (29)$$

At block 148, the method 140 includes determining a next power spectral density of the estimated system process noise $\hat{\Xi}_{f_r f_r}(k+1)$. As one example, the hearing device may use equation 30 to determine the scalar version of the next power spectral density of the system process noise estimate $\hat{\Xi}_{f_r f_r}(l,k+1)$:

$$\hat{\Xi}_{f_r f_r}(l, k+1) = A^2 \cdot \left[1 - \frac{R}{M}\mu(l,k)|U_h(l,k)|^2\right]\hat{\Xi}_{f_r f_r}(l,k) + \hat{\Phi}_{\Delta\Delta}(l) \quad (30)$$

where μ(l,k) and $U_h$(l,k) are the scalar forms of μ(k) and $U_h$(k), respectively.

As seen from equation 26, the weight matrix $W_2$ (k) is determined in the previous iteration of the method 140 (i.e., at time k−1). Thus, the method 140 includes determining a next feedback path error covariance P(k+1), at block 150. When a Kalman filter is used as an adaptive feedback cancellation filter, the feedback path error covariance P(k) provides an indication of how well the estimated feedback path matches the actual feedback path. In one example, the feedback path error covariance P(k) (i.e., the a priori estimate of the convergence of the estimated feedback path to the actual feedback path) can be approximated from the spectral convergence-state of the feedback path $\hat{\Xi}_{f_r f_r}$(k), as shown in equation 31:

$$P(k) \approx M \cdot \text{diag}\{\hat{\Xi}_{f_r f_r}(k)\} \quad (31)$$

From equation 26, the initial feedback path error covariance P(0) depends on the initial spectral density of the estimated system process noise $\hat{\Xi}_{f_r f_r}$(0), which can be derived from a measurable quantity determinable for different acoustic environments and for different feedback paths and different acoustic environments.

The hearing device can then determine the next feedback path error covariance P(k+1) using equation 32:

$$P(k+1) = A^2 \cdot P^+(k) + M \cdot \text{diag}\{\hat{\Phi}_{\Delta\Delta}(k)\} \quad (32)$$

where $P^+$(k) is an a posteriori estimate of the feedback path error covariance, and $\hat{\Phi}_{\Delta\Delta}$(k) is estimated power spectral density of estimated process noise signal $\Delta\hat{F}$(k). The hearing device can, in turn, determine the a posteriori estimate of the feedback path error covariance $P^+$(k), as shown in equation 33:

$$P^+(k) = \left[I_M - \frac{R}{M}\text{diag}\{\mu(k)\}U_h^H(k)U_h(k)\right]P(k) \quad (33)$$

where $I_M$ is an M×M identity matrix.

Now at block 152, the method 140 includes determining whether the next feedback path error covariance P(k+1) is threshold high or threshold low. If the feedback path error covariance P(k+1) is threshold high or threshold low, then the hearing device may determine that a change in the external feedback path has occurred. Such changes may occur as a result of the recipient placing her hand on or near the hearing device or on the recipient's head, the recipient wearing a hat or taking a hat off, or the recipient moving a telephone toward or away from the hearing device.

If the hearing device determines that the next feedback path error covariance P(k+1) is threshold high or threshold low, then the method 140 continues at block 154 with (i) selecting a new environmental classifier based at least in part on the next feedback path error covariance P(k+1) and (ii) initializing the filter based on the new environmental classifier. As discussed above, the implementation of the Kalman filter requires that the feedback path error covariance P(k) be within a tolerance of the power spectral density of the system process noise $\hat{\Xi}_{f_r f_r}$(k). If the feedback path error covariance P(k) begins to diverge from the power spectral density of the system process noise $\hat{\Xi}_{f_r f_r}$(k), indicating the modeled feedback path no longer matches the actual feedback path, then the calculations necessary to determine future updates to the filter transfer function F̂(k) may exceed the dynamic range of the hearing device's sound processor(s).

When performing the functions of block 154, the hearing device may select a new environmental classifier based the next feedback path error covariance P(k+1) in addition to spectral information in previous samples of the audio output signal u(k). The hearing device may then reinitialize the Kalman filter using the initial feedback path error covariance P(0) for the selected environmental classifier (e.g., $\hat{\Xi}_{f_r f_r}$(k) (0), as measured for the acoustic environment corresponding to the selected environmental classifier).

If the hearing device determined that the next feedback path error covariance P(k+1) was not threshold high/low, or after performing the functions of block 154, the method 140 continues at block 156 with another decision point: determining whether to update the power spectral density of the estimated process noise signal $\hat{\Phi}_{\Delta\Delta}$(k). By way of example, the hearing device may determine to update the estimated power spectral density of the estimated process noise signal $\hat{\Phi}_{\Delta\Delta}$(k) by determining whether the remainder of k divided by a positive integer $N_{update}$ is true, as shown in equation 34:

$$\text{mod}(k, N_{update}) \text{−=} 0 \quad (34)$$

If the hearing device determines that equation 34 is false, then the method 140 includes returning to block 112 of the method 100. But if the hearing device determines that equation 33 is true, then the method 140 continues at block 158 with updating the power spectral density of the estimated process noise $\hat{\Phi}_{\Delta\Delta}$(l).

By way of example, the hearing device may determine an update to the power spectral density of the estimated process noise $\hat{\Phi}_{\Delta\Delta}$(l) by determining a frequency specific power spectral density for each of the M frequency channels. In this case, the hearing device may update the power spectral density of the estimated process noise $\hat{\Phi}_{\Delta\Delta}$(l) based on average value of the estimated feedback path F̂(k) with respect to k, as shown equation 35:

$$\hat{\Phi}_{\Delta\Delta}(l) = (1 - A^2) \cdot \mathbb{E}_k\{|\hat{F}(l,k)|^2\} \quad (35)$$

where $|\hat{F}(l,k)|^2$ is a feedback canceller periodogram, which is assumed to be converging toward the real feedback path (i.e., $\hat{F}(l,k) \approx F(l,k)$). After completing the steps of block 154, the method 140 includes returning to block 112 of the method 100.

Returning then to FIG. 4, the method 100 includes incrementing the value of j by one and returning to block 112. In this manner, the hearing device may continue generating output signals from filtered input audio signals and dynamically updating the adaptive filter.

Note that the descriptions of the methods 120 and 140 could be further modified to reduce the complexity of the operations performed by the hearing device. By way of example, $Q^H F_M^{-1}$ in Equation 15 and $F_M[I_M - QQ^H]F_M^{-1}$ in Equations 19 and 28 are convolution (correlation) constraints that linearize the circular convolution (correlation) of time-domain signals. Removing these terms may reduce the computational complexity of implementing an adaptive filter at the possible expense of slower convergence of the estimated feedback path to the actual feedback path.

In line with the discussion above, a hearing device may also implement all or some of the methods 100, 120, and/or 140 in other applications. For example, a hearing device may use portions of the methods 100 and 120 to decorrelate input and output audio signals prior to filtering the input audio signal with a static filter. As another example, a hearing device may implement portions of the methods 100, 120, and 140 to decorrelate the input and output audio signals using a time-constant model (as opposed to the time-varying models described above). And in yet another example, a hearing device may implement portions of the methods 100, 120, or 140 to filter other undesirable components of an audio signal, such as echoing or noise.

Figure 7:
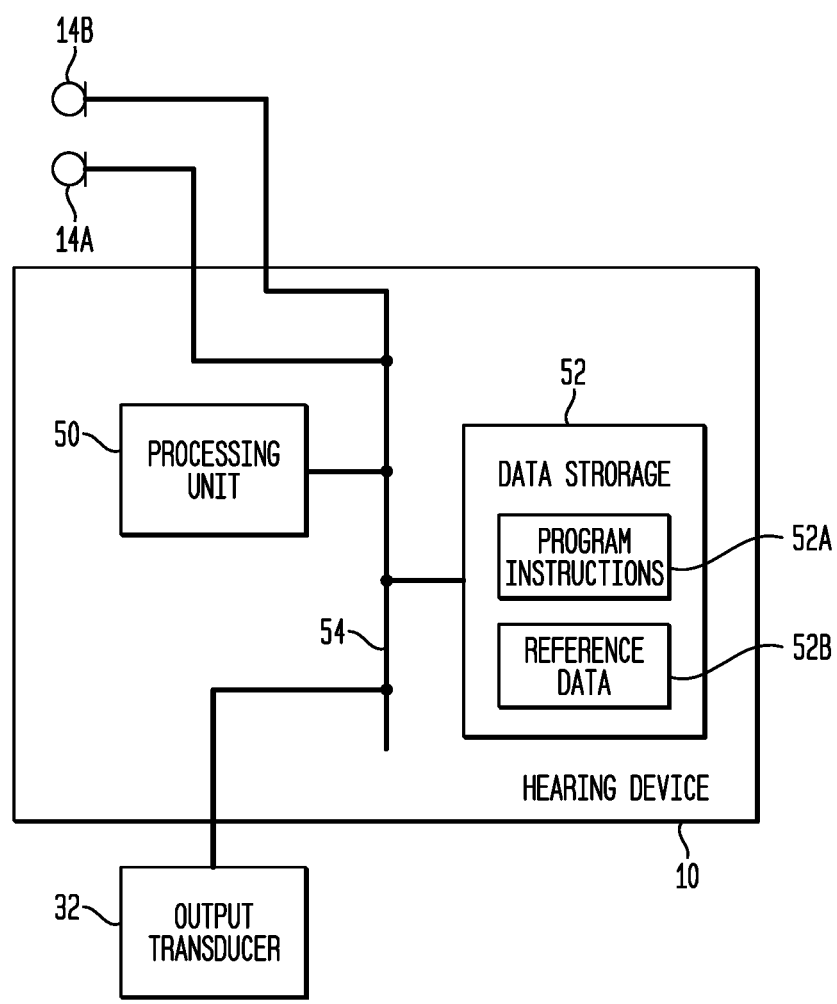
FIG. 7 is a block diagram showing components of an example hearing device.

Finally, FIG. 7 is a block diagram of example components of the hearing device 10. In line with the above discussion, the hearing device 10 includes the first and second microphones 14A and 14B and the output transducer 32, as well as a processing unit 50 and data storage 52, which are communicatively linked together by a system bus, network, or other connection mechanism 54. The hearing device 10 may also include a power supply (not shown), such as a rechargeable battery, that is configured to provide power to the components of the hearing device 10, as well as a separate micro-controller (not shown) that may handle communications between the components of the hearing device 10.

In one example, the output transducer 32 is implanted or in the recipient (or may be insertable into the recipient's ear canal), while the remaining the components of the hearing device 10 may be included in one or more housings externally worn by the recipient. Alternatively, the hearing device 10 could be implemented as a totally implanted hearing prosthesis, in which case the housing(s) may also implanted in the recipient.

The microphones 14A and 14B may include omnidirectional microphones externally-located on a housing of the hearing device 10, with the housing being worn by a recipient or implanted in the recipient's body. Alternatively, either of the microphones 14A and 14B may include a different type of input audio transducer, such as a directional microphone or any other input audio transducer now known or later developed that is suitable for generating electrical representations of sound. The microphones 14A and 14B may be mounted on or near an external surface of a housing of the hearing device 10 such that the first microphone 14A is in front of and in-line with the second microphone 14B when the recipient wears the hearing device 10.

The output transducer 32 may include any transducer suitable for generating from an electrical signal a stimulus that causes a recipient to perceive at least a portion of a sound. By way of example, if the output transducer 32 is electromechanical transducer, the output transducer 32 may use the output signal to generate a vibration that, when delivered to a portion of the recipient's skull for example, causes the recipient to perceive at least a portion of the sound 12. Alternatively, if the output transducer 32 is an electrode array implanted in a cochlea of the recipient, the output signal may include information for causing one or more of the electrodes on the electrode array to deliver an electrical stimulus to the recipient. Such electrical stimuli may cause the recipient to perceive a portion of the sound 12. And as yet another example, the output transducer 32 may include a speaker that delivers the stimulus as an acoustic stimulus.

The processing unit 50 may then comprise one or more digital signal processors (e.g., application-specific integrated circuits, programmable logic devices, etc.), as well as analog-to-digital converters. By way of example, the processing unit may include one or more sound processors configured to perform the functions described with respect to the beamformer module 22, the classification module 24, the filter module 26, the signal processing module 28, and/or the post-processing module 30 described with respect to FIGS. 2 and 3.

The data storage 52 may comprise one or more volatile and/or non-volatile storage components, such as magnetic, optical, or flash storage, and may be integrated in whole or in part with processing unit 52. As shown, the data storage 52 may hold program instructions 52A executable by the processing unit 50 to carry out various hearing device functions described herein, as well as reference data 52B that the processing unit 50 may reference as a basis to carry out various such functions.

By way of example, the program instructions 52A may be executable by the processing unit 50 to facilitate selecting one of a plurality of environmental classifiers based on an acoustic environment in which the hearing device 10 operates. The reference data 52B may store the plurality of environmental classifiers, as well as initial filter parameters that correlate to each environmental classifier. Additionally, the program instructions 52A may be executable by the processing unit 50 to perform functions described with respect to the methods 100, 120, and/or 140. The processing unit 50 may thus update and store parameters for the adaptive filter in the reference data 52B.

In the above description, the methods, systems, and devices are described with respect to a use that includes a hearing device that is configured to deliver a stimulus to a recipient via a mechanical and/or an acoustical force. Alternatively, the methods, systems, and devices described herein may be used in other applications in which it is desirable to identify and suppress feedback artifacts prior the feedback artifacts being audible, or for using adaptive signal modeling based on an acoustic environment in which one or more microphones receive sounds.

With respect to any or all of the block diagrams, examples, and flow diagrams in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   based at least in part on an environmental classifier, selecting a sound source model from a plurality of sound source models, wherein each sound source model provides an estimate of a sound signal in at least one of a plurality of acoustic environments, and wherein the environmental classifier is indicative of an acoustic environment in which a microphone receives sound;
   using the selected sound source model to update a parameter of a filter;
   processing an input audio signal provided by the microphone to generate an output audio signal, wherein processing the input audio signal comprises filtering the input audio signal with the filter; and
   causing an output transducer to provide an output that is based on the output audio signal.

2. The method of claim 1, wherein the filter comprises a Kalman filter.

3. The method of claim 2, wherein the parameter is a feedback path error covariance.

4. The method of claim 1, wherein the filter comprises a least mean squares filter.

5. The method of claim 4, wherein the filter comprises one of (i) a normalized least mean squares filter, (ii) a proportionate normalized least mean squares filter, or (iii) a Levenberg-Marquardt regularized normalized least mean squares filter.

6. The method of claim 1, wherein using the selected sound source model to update the parameter of a filter comprises using the selected sound source model to pre-filter the input audio signal and a previously-generated output audio signal, thereby generating a pre-filtered input audio signal and a pre-filtered output audio signal.

7. The method of claim 6, wherein using the selected sound source model to update the parameter of a filter further comprises (i) filtering the pre-filtered output audio signal with the filter to generate a pre-filtered feedback estimate, and (ii) determining a difference between the pre-filtered input audio signal and the pre-filtered feedback estimated to generate a pre-filtered source signal, wherein a update to the parameter is based at least in part on the pre-filtered source signal.

8. The method of claim 1, wherein the parameter of the filter is an estimated power spectral density of one or more feedback artifacts.

9. The method of claim 1, the parameter of the filter is one of (i) a frequency-dependent regularization parameter, (ii) a parameter that assigns an importance value to each of a plurality of frequency components of each pre-filtered output audio signal, or (iii) a parameter that accounts for time-dependent variations in an external feedback path.

10. The method of claim 1, wherein the filter is a frequency-domain filter.

11. The method of claim 1, wherein the output transducer is a component of a hearing device.

12. A method comprising:
    based on a first portion of an audio input signal, determining an environmental classifier that is indicative of an acoustic environment in which a hearing prosthesis is located;
    based at least in part on the determined environmental classifier and the first portion of the audio input signal, updating a parameter of a filter, wherein the filter is configured to remove feedback artifacts from the audio input signal;
    using the filter to remove a feedback artifact from a second portion of the audio input signal, thereby providing a filtered audio input signal, wherein the hearing prosthesis receives the second portion of the audio signal after the first portion of the audio signal; and
    based on the filtered audio input signal, generating and outputting by the hearing prosthesis an audio output signal.

13. The method of claim 12, wherein the filter comprises a Kalman filter.

14. The method of claim 12, wherein the filter comprises a least mean squares filter.

15. The method of claim 14, wherein the filter comprises one of (i) a normalized least mean squares filter, (ii) a proportionate normalized least mean squares filter, or (iii) a Levenberg-Marquardt regularized normalized least mean squares filter.

16. The method of claim 12, wherein the filter is initialized with at least one recipient-specific feedback measurement.

17. The method of claim 12, wherein the first portion of the audio signal comprises a plurality of audio samples, wherein updating the parameter of the filter comprises determining, for each of the plurality of audio samples, a decorrelated audio sample based on a source signal model, and wherein the source signal model is based on the environmental classifier.

18. The method of claim 17, wherein each of the plurality of audio samples corresponds to a previously-generated output signal, wherein the hearing prosthesis outputs each previously-generated output signal before generating and outputting the first output signal, and wherein updating the parameter of the filter comprises updating a step size for the filter by:
    for each previously-generated output signal, (i) determining a decorrelated output signal based on the source signal model, (ii) determining an estimated feedback signal by filtering the decorrelated output signal with the filter, and (iii) determining a difference between the corresponding decorrelated audio input signal and the estimated feedback signal;
    based on at least one of the determined differences, determining an updated step size for the filter.

19. The method of claim 12, wherein updating the parameter of the filter includes at least one of (i) providing frequency-dependent regularization, (ii) assigning an importance value to each of a plurality of frequency components of each decorrelated output signal, or (iii) accounting for time-dependent variations in an external feedback path.

20. The method of claim 12, wherein the filter is a frequency-domain filter.

* * * * *